United States Patent [19]

Hegel

[11] Patent Number: 4,785,064

[45] Date of Patent: * Nov. 15, 1988

[54] ULTRA-VIOLET LIGHT CURABLE COMPOSITIONS FOR ABRASION RESISTANT ARTICLES

[75] Inventor: Ramon F. Hegel, St. Paul, Minn.

[73] Assignee: Minnesota Mining and Manufacturing Company, St. Paul, Minn.

[*] Notice: The portion of the term of this patent subsequent to Mar. 17, 2004 has been disclaimed.

[21] Appl. No.: 926,645

[22] Filed: Nov. 3, 1986

Related U.S. Application Data

[63] Continuation of Ser. No. 629,353, Jul. 10, 1984, Pat. No. 4,650,845.

[51] Int. Cl.[4] .................. C08F 126/06; C08F 126/02; C08F 226/02
[52] U.S. Cl. .................................... 526/261; 526/301
[58] Field of Search ................................ 526/301, 261

[56] References Cited

U.S. PATENT DOCUMENTS

| | | | |
|---|---|---|---|
| 3,531,442 | 9/1970 | Miller | 526/258 |
| 4,150,234 | 4/1979 | Seltzer et al. | 526/258 |
| 4,480,079 | 10/1984 | Orton et al. | 526/301 |
| 4,650,845 | 3/1987 | Hegel | 526/261 |

FOREIGN PATENT DOCUMENTS 0068632  5/1983  European Pat. Off. ............ 526/301

Primary Examiner—Joseph L. Schofer
Assistant Examiner—Peter F. Kulkosky
Attorney, Agent, or Firm—Donald M. Sell; James V. Lilly

[57] ABSTRACT

Inherently highly abrasion-resistant cast articles are prepared by polymerizing a composition comprising (I) as a first component from 0 to 100 parts of urethane polyacrylic ester and (II) as a second component, correspondingly from 100 to 0 parts of a composition containing (A) 30 to 60% by weight of a polyacrylic ester having 4 to 10 acryloyloxy groups, (B) 20 to 70% by weight of a polymerization shrinkage modifier, and (C) 0 to 30% of a diluent monomer. A source of free-radicals may be added to the composition.

25 Claims, No Drawings

ULTRA-VIOLET LIGHT CURABLE COMPOSITIONS FOR ABRASION RESISTANT ARTICLES

This is a continuation of application Ser. No. 629,353 filed July 10, 1984, now U.S. Pat. No. 4,650,845.

FIELD OF THE INVENTION

This invention relates to polymeric abrasion-resistant articles and to resin compositions of compounds having a plurality of ethylenically-unsaturated carbamic ester groups useful for preparing such articles. As used throughout this specification, "ethylenically-unsaturated carbamic ester groups" refers to polymer side chain groups having a single urethane linkage and terminal olefinic functionality. Articles made from resin compositions of the invention readily release from molds without use of release agents and are inherently abrasion-resistant.

BACKGROUND ART

Plastic articles have found a variety of use. For example, plastic optical articles (such as video discs and ophthalmic lenses) are widely used in place of such articles made from ground glass because the former are light in weight and inexpensive to produce. As disclosed in U.S. Pat. Nos. 3,380,460 and 3,931,373, the most widely used plastic ophthalmic lens material is polymerized diethylene-glycol bis(allyl carbonate). This polymer is characterized by excellent clarity, resistance to discoloration, high strength, and high impact resistance. However, polymerization of diethyleneglycol bis(allyl carbonate) is generally accompanied by high shrinkage during cure (e.g., from 11 to 14%) and extended curing time (e.g., from 5 to 16 hours or more). The high shrinkage levels create difficulties in the production of plastic ophthalmic lenses from this material, particularly in the production of lenses having large differences in thickness between the center and edges of the lens. The extended cure times tie up production facilities and lead to inefficient utilization of the dies in which the lenses are molded. Also, the thermal cure cycle used to polymerize the monomer consumes large amounts of energy and undesirably thermally stresses the glass dies. Furthermore, the abrasion resistance of ophthalmic lenses made from this monomer is not satisfactory. Consequently, such lenses are typically coated to improve their abrasion resistance. The application of such coatings introduces problems such as adhesion failure, crazing, index of refraction differences, and flow lines. This last problem is particularly troublesome with multifocal lenses.

Some polymerizable compositions containing four or more ethylenically-unsaturated carbamic ester groups and a copolymerizable diluent monomer have been broadly included in proper disclosures. See, for example, U.S. Pat. Nos. 3,509,234; 3,700,643; 3,782,961; 3,907,865; 3,928,299; 3,954,584; 3,954,714; 4,006,024; 4,072,770; 4,108,840; 4,112,017; 4,131,602; 4,133,723; 4,188,455; 4,228,232; 4,246,391; 4,287,323; and 4,330,657; and U.K. Published Patent Application No. 2,050,396 A.

These disclosures are related to thin-film or coating compositions such as paints, varnishes, printing plates and photoresists, which are generally less than two millimeters thick. They fail to describe which, if any, of those compositions would have a desired balance of useful properties such as low polymerization shrinkage, low viscosity, absence of coloration, high hardness, resistance to stress cracking, and an abrasion resistance of greater than 140 kilopascals (kPa) (20 psi). Additionally, they fail to teach how to obtain resins providing the desired balance of properties which are useful for providing cast articles such as plastic ophthalmic lenses and which eliminate the need for coating the articles with an abrasion resistant coating. Moreover, many of the compositions shown in these references are derived from diisocyanates (e.g., toluene diisocyanate), and the resulting compositions have two or more urethane linkages in each side chain. These compositions generally have too high a viscosity to be useful for optical casting purposes.

Compositions which contain four or more ethylenically-unsaturated carbamic ester groups attached to a polyester, polyether, or polyacrylate backbone and articles prepared therefrom have been disclosed in EPO No. 0068632, published May 1, 1983. The resins disclosed therein can be diluted with up to 50% by weight of one or more diluent monomers having one or more ethylenically-unsaturated groups and can be cured in castings having a thickness greater than about 2 millimeters to form articles having Barcol hardness of greater than about 15. However, these compositions do not have an abrasion resistance greater than about 700 kPa (about 100 psi).

DISCLOSURE OF THE INVENTION

The present invention provides highly abrasion-resistant articles that readily release from casting molds without having to employ the use of release agents. The articles exhibit a resistance to abrasion by 000 steel wool of at least 140 kPa (20 psi), preferably, 700 kPa (about 100 psi). That is, they do not show visible scratches when rubbed with 000 steel wool under a pressure of at least 140 kPa. The articles of the invention may be prepared by polymerizing a colorless composition comprising per 100 parts by weight:

I. as a first component, from 0 to 100 parts by weight of a colorless urethane polyacrylic ester;

II. as a second component, correspondingly from 100 to 0 parts by weight of a composition containing;
 (A) from 30 to 60% by weight of a polyacrylic ester;
 (B) from 20 to 70% by weight of a polymerization shrinkage modifier; and
 (C) from 0 to 30% by weight of a diluent monomer; and III. as a third component, from 0 to 5% by weight of I and II of a source of free radicals.

By the term "colorless" it is meant that the urethane polyacrylic ester component has an absorbance for visible radiation (i.e., from about 400 to 600 nm) of less than about 0.1.

The urethane polyacrylic ester useful herein as the first component (component I) has the formula

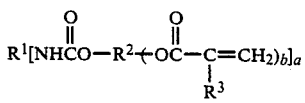

FORMULA I wherein:

$R^1$ has the valence "a" and is the residue remaining after the removal of —NCO groups from an organic polyisocyanate;

$R^2$ has the valence $b+1$ and is a polyvalent aliphatic group having 4 to 10 carbon atoms (preferably 5 carbon atoms and, optionally, one caternary oxygen atom);

$R^3$ is —H or —$CH_3$;

a is a number having a value of at least 2; and b is an integer of 3 to 5.

The composition useful as the second component (component II) herein contains:

(A) from 30 to 60% by weight of a polyacrylic ester of an alkane, a cycloalkane, or an azacycloalkane polyol, the polyol having up to 24 carbon atoms and the ester having 4 to 10 acryloyloxy groups and nitrogen, when present, being covalently bonded to the carbon of a carbonyl group;

(B) from 20 to 70% by weight of a polymerization shrinkage modifier; and (C) from 0 to 30% by weight of one or more diluent monomers having one to three acryloyloxy groups copolymerizable with the compounds of (A) and (B).

The polymerization shrinkage modifier (part B of the second component) is preferably selected from the group consisting of (1) a polymerizable carbamic compound having at least two groups select from groups having the formulae $$-\underset{\underset{O}{\|}}{H}NC- \text{ and } -\underset{\underset{O}{\|}}{H}NCO-$$

and at least two acrylic groups per 168 to 2000 of molecular weight and a molecular weight of 168 to 5000, and (2) a polymerizable poly(acryloyloxyalkoxy)alkane, cycloalkane or azacycloalkane defined hereinafter.

The polymerizable carbamic compound (part B(1) of the second component) is preferably selected from the group consisting of (i) a carbamic ester having the formula $$(H_2C=C-R^4-NHCO)_{\overline{c}}R^5 \quad\quad \text{FORMULA II}$$
$$\phantom{xxxxx}|\phantom{xxxxxxxxxxxxxxxxx}$$
$$\phantom{xxx}R^3$$

in which:

$R^3$ is —H or —$CH_3$;

$R^4$ is a divalent aliphatic group selected from —$R^6$— and $$-\underset{\underset{O}{\|}}{C}OR^6-,$$

in which —$R^6$— is an alkylene group having 1 to 6 carbon atoms or a 5- or 6-membered cycloalkylene group having 5 to 10 carbon atoms;

$R^5$ is a polyvalent linear structure obtained by removal of the hydroxyl groups from a monomeric or polymeric aliphatic polyol;

c is an integer of from 2 to 15 (preferably 3 to 6);

(ii) an acryloyloxyalkylisocyanurate of the formula

FORMULA III in which:

$R^7$ is polyvalent aliphatic group selected from $R^6$ and $$R^6-\underset{\underset{O}{\|}}{N}HCOR^{11}$$

in which $R^6$ is as defined for Formula II and $R^{11}$ has a valence of $g+1$ and is a polyvalent aliphatic group having 4 to 10 carbon atoms (preferably 5 carbon atoms) and, optionally, one catenary oxygen atom;

g is an integer of 1 to 3, and (iii) a polyacrylamido compound having the formula $$R^8 +NH\underset{\underset{O}{\|}}{C}-\underset{\underset{R^3}{|}}{C}=CH_2)_d \quad \text{FORMULA IV}$$

wherein:

$R^3$ is as defined above, $R^8$ is a linear, branched, or cyclic alkadiyl or -triyl group having 2 to 10 carbon atoms and, optionally, up to 4 caternary oxygen atoms; and d is the integer 2 or 3.

The polymerizable material useful as part B(2) of the second component may be represented by the formula $$[H_2C=\underset{\underset{R^3}{|}}{C}-R^4+OR^9\!\!\!-_{\overline{e}}]_f R^{10} \quad \text{FORMULA V}$$

In this formula $R^3$ and $R^4$ are as defined above;

$R^9$ is alkylene group having from 2 to 4 carbon atoms;

e is a number having a value of 1 to 3;

f is an integer of from 3 to 6; and $R^{10}$ is a residue of an alkane, cycloalkane, or azacycloalkane polyol having up to 24 carbon atoms wherein the nitrogen of the azacycloalkane is covalently bonded to the carbon of a carbonyl group.

The source of free radicals (the third component) comprises from 0 to 5% by weight of total parts of the first and second components of an energy-activatable source of free radicals.

The articles of the invention generally have a thickness greater than about 2 millimeters, an index of refraction greater than about 1.45 and less than about 1.75, a birefringence of essentially zero, light transmission greater than about 85%, yellow coloration less than about 4 Gardner b units, a Barcol hardness greater than about 15 (with Barcol hardness being measured herein using Indenter No. "GYZJ 934-1", commercially available from the Barber-Coleman Company), and a heat distortion greater than 200° C.

The present invention also provides a method for preparing cast optical articles comprising the steps of:
(1) mixing components I, II and, optionally, III of the polymerizable composition to form an optical casting resin,
(2) degassing the resin,
(3) introducing the degassed resin into a suitable mold, and
(4) effecting polymerization of the resin.

DETAILED DESCRIPTION OF THE INVENTION

The urethane polyacrylic ester of Formula I (the first component), is preferably prepared by reaction of one mole of di- or triisocyanate, respectively, with 2 to 2.2 moles or 3 to 3.3 moles of a polyacryloyloxyalkanol. The polyacryloyloxyalkanols can be considered as polyols having 4 to 10 carbon atoms and 4 to 6 hydroxy groups, of which all but about one hydroxyl group has been esterified with an acrylic acid. The term "acryloyloxy" as used herein includes both the acryloyloxy group and the methacryloyloxy group. Representative examples of useful polyacryloyloxyalkanols are pentaerythritol triacrylate, dipentaerythritol pentaacrylate, 2,2,3,3-tetra(acryloyloxymethyl)-propanol, arabitol tetraacrylate, and sorbitol pentaacrylate and the corresponding methacrylates.

Isocyanates that can be used in the preparation of the urethane polyacrylic ester include the aliphatic, cycloaliphatic, and aromatic polyisocyanates having at least two isocyanate groups. Such compounds are known and include 2,4-tolylene diisocyanate, 3,5,5-trimethyl-1-isocyanato-3-isocyanatomethylcyclohexane also called isophorone diisocyanate), hexamethylene diisocyanate, 1,3,5-tris(6-isocyanatohexyl-1,3,5-triazine-2,4,6(1H, 3H, 5H)trione, 1,3-di(isocyanatoethyl)hydantoin, 2,2,4-trimethylhexamethylene diisocyanate and 1,3,5-benzenetriisocyanate. Other suitable polyisocyanates are described in U.S. Pat. Nos. 3,641,199; 3,700,643; and 3,931,117, among many others.

The polyacrylic ester useful as part A of the second component herein comprises one or more polyacrylic acid esters of an alkane, cycloalkane or azacycloalkane polyol, the polyol having up to 24 carbon atoms. Nitrogen, when present, is covalently bonded to a carbonyl group. Examples of such compounds include pentaerythritol tetraacrylate, dipentaerythritol hexaacrylate, pentaacryloyloxymethylethane, 3,3,7,7-tetra(acryloyloxymethyl)-5-oxanonane, arabitol pentaacrylate, sorbitol hexaacrylate and the corresponding methacrylates, and 1,3-bis(2-acryloyloxyethyl-5,5-dimethyl)-2,4-imidazolidinedione.

Polymerization shrinkage modifiers useful as part B of the second component are materials whose mechanism of operation is not understood but which overcome the problems of shrinkage encountered in the polymerization of highly acrylated monomers such as pentaerythritol tetraacrylate. Such monomers, without the modifier, polymerize rapidly and shrink during polymerization to such an extent that polymers obtained therefrom are full of internal stress and are extremely brittle. The shrinkage modifiers useful herein are believed to release this stress and allow the formation of highly acrylated polymers having essentially no internal stress.

Suitable shrinkage modifiers are polymerizable compounds having a plurality of carbamic linkages (Part B(1)) or a plurality of ether linkages (Part B(2)).

Carbamic esters (Part B(1)(i)) of the optical casting resin are preferably prepared by reacting one or more monoisocyanate-substituted, addition-polymerizable ethylenically-unsaturated organic compounds (such compounds being sometimes referred to hereafter as "ethylenically-unsaturated isocyanates") with at least one polyol which can be any aliphatic monomeric or polymeric polyol. The polyol preferably is a polyester polyol, polyether polyol or polyacrylate polyol (such polyester polyols, polyether polyols, and polyacrylate polyols being sometimes referred to collectively hereafter as "polyols"), said polyols having at least two hydroxyalkyl or hydroxycycloalkyl groups per molecule. The amount of reactants and time of reaction are chosen so as to result in consumption of essentially all free isocyanate groups in the reaction mixture as determined by, for example, infrared analysis. Generally, about 0.8 to 1 mole of ethylenically-unsaturated isocyanates are used per mole of hydroxyl groups in the polyols. Preferably, the reaction between ethylenically-unsaturated isocyanates and polyols is carried out in the presence of a suitable catalyst such as dibutyltin dilaurate. The reaction is generally performed in a suitable mixing vessel under substantially anhydrous conditions at temperatures from about 25° C. to 100° C. for ten minutes or more, utilizing bath or continuous processing.

Preferred ethylenically-unsaturated isocyanates are compounds having the general formula

FORMULA VI wherein $R^3$ and $R^4$ are as defined previously. Preferably, $R^3$ is methyl and $R^4$ is a divalent carbonyloxyalkylene radical having 2 to 7 carbon atoms.

Preferred compounds of Formula VI are isocyanatoalkyl acrylates and methacrylates such as isocyanatomethyl acrylate, 2-isocyanatoethyl acrylate, 2-isocyanatoethyl methacrylate, 3-isocyanatopropyl acrylate, 3-isocyanatopropyl methacrylate, and 6-isocyanatohexyl acrylate. A preferred ethylenically unsaturated isocyanate is 2-isocyanatoethyl methacrylate. Other useful compounds of the Formula VI type include ethylenically-unsaturated isocyanate esters such as allyl isocyanate, methallyl isocyanate, 4-ethenylcyclohexyl isocyanate and 2-(2-acryloyloxyethoxy)ethyl isocyanate. The ethylenically-unsaturated isocyanates of Formula VI can be prepared using methods known to those skilled in the art of organic synthesis.

Monomeric aliphatic and polymeric polyols which can be used to prepare the polymerizable carbamic ester resins for making the optical articles of this invention preferably contain only carbon, hydrogen and oxygen, but can, if desired, contain other chain atoms (e.g., sulfur atoms) or substituent groups (e.g., chloromethyl groups) which do not interfere with the functioning of the polymerizable carbamic ester as an optical casting resin. They have at least two hydroxyl groups, a hydroxyl equivalent weight of 31 to 1000, preferably 59 to 300, and a molecular weight of 62 to 5000, preferably 118 to 2100.

The monomeric aliphatic polyols are those polyols that do not contain repeating units in contrast to the polymeric aliphatic polyols which can contain from 2 to about 100 units, such as —$CH_2CH_2O$—, that are connected together in a chain. Monomeric aliphatic polyols are well known and include, for example, alkane polyols such as ethylene glycol, 1,3-propylene glycol, 1,4-butylene glycol, glycerine, neopentyl glycol, trimethylolpropane, tetramethylolethane, pentaerythritol, dipentaerythritol, erythritol, arabitol and sorbitol.

Polymeric polyols that can be used to prepare the polymerizable carbamic ester resin polyols have, as the name implies, a backbone that contains repeating units. The polyols include the polyester, polyether, and polyacrylate polyols having at least two hydroxyl groups. The polymeric polyols preferably have a hydroxyl equivalent weight between 175 and 300. If polyols having hydroxyl equivalent weight greater than about 1000 are used, the resulting polymerizable carbamic ester resin will have inadequate hardness for use as an optical casting resin. Polyester polyols are preferred polyols for use in preparing the polymerizable carbamic ester resins of this invention.

Suitable polyester polyols can be prepared by esterifying: (a) $C_{2-15}$ aliphatic acyclic or $C_{4-15}$ alicyclic polyols having three or more hydroxyl groups per molecule, with (b) polycarboxylic acid (preferably dicarboxylic acids) selected from $C_{4-12}$ aliphatic acyclic polycarboxylic acid, $C_{5-8}$ alicyclic polycarboxylic acids, $C_{5-15}$ aromatic polycarboxylic acids, or methyl or ethyl esters or anhydrides of such polycarboxylic acids. Such polycarboxylic acids, methyl or ethyl esters thereof, and anhydrides thereof are sometimes referred to collectively hereafter as "polycarboxylic acids". Optionally, $C_{2-15}$ aliphatic acyclic diols, $C_{4-15}$ alicyclic diols, $C_{2-6}$ omega-hydroxyalkanecarboxylic acids or lactones can be added to the above-described mixture of $C_{2-15}$ aliphatic acyclic or $C_{4-15}$ alicyclic polyols and polycarboxylic acids. The ratio of total moles of aliphatic acyclic polyols, alicyclic polyols, aliphatic acyclic diols, and alicyclic diols to total moles of polycarboxylic acids, omega-hydroxyalkanecarboxylic acids, and lactones should be such as to provide essentially complete esterification of carboxylic acid groups, and a product polyester having a molecular weight no more than about 5000. Sufficient aliphatic acyclic or alicyclic polyols should be used to provide a product polyester polyol having at least four hydroxyl groups per molecule.

Especially preferred polyester polyols are esters derived from a specified amount of certain cyclic compounds, and are prepared by employing about 0.02 to 0.5 moles of cyclic compounds selected from: (a) $C_{5-8}$ alicyclic dicarboxylic acids or anhydrides thereof, (b) $C_{5-15}$ aromatic dicarboxylic acids or anhydrides thereof, or (c) $C_{4-15}$ cycloalkylene diols per mole of $C_{2-15}$ aliphatic acyclic polyols. The remainder of the compounds from which said polyester polyol is derived comprise acyclic compounds. The resulting polyester polyols can be used to prepare polymerizable carbamic ester resins which provide cast optical articles having especially high heat deflection temperature (e.g., above about 200° C.) and Barcol hardness (e.g., greater than 20 as measured using Indentity No. "GY-ZJ 934-1").

Suitable polyester polyols can also be prepared by combining, on a molar basis, one mole of $C_{4-15}$ polyols having four or more hydroxyl groups per molecule and about 4 to 15 moles of $C_{2-6}$ omega-hydroxyalkanecarboxylic acids or lactones. The reactants should be combined in amounts sufficient to esterify essentially all carboxylic acid groups present and provide a product polyester polyol having a molecular weight no more than about 5000, and having at least four hydroxyl groups per molecule.

Aliphatic acyclic polyols which can be used to prepare the above-described polyester polyols include ethylene glycol, 1,4-butanediol, 1,3-butanediol, 2,2-dimethyl-1,3-propanediol, 1,6-hexanediol, 1,12-dodecanediol, glycerine, 2,-hydroxymethyl-1,3-propanediol, 1,1,1-tri(-hydroxymethyl)propane, 1,2,4-butanetriol, 1,2,6-hexanetriol, dipropylene glycol, pentaerythritol, dipentaerythritol, tripentaerythritol, sorbitol, disorbitol, and mixtures thereof.

Alicyclic polyols which can be used to prepare the above-described polyester polyols include 1,4-cyclohexanediol, 1,4-bis(hydroxymethyl)cyclohexane, bis(4-hydroxycyclohexyl)-methane, bis(4-hydroxymethylcyclohexyl)methane, 2,2-bis(4-hydroxycyclohexyl)propane, and mixtures thereof.

Suitable polycarboxylic acids which can be used to prepare the above-described polyester polyols include succinic acid, maleic acid, glutaric acid, 2,2-dimethylsuccinic acid, pimelic acid, adipic acid, sebacic acid, dilactic acid, tetrahydrophthalic acid, hexahydrophthalic acid, phthalic acid, phthalic anhydride, isophthalic acid, terephthalic acid, tetrachlorophthalic acid, 2,2'-benzophenonedicarboxylic acid, 4',4'-diphenylmethanedicarboxylic acid, 2,5-naphthalenedicarboxylic acid, dimethyl succinate, diethyl adipate, dimethyl tetrahydrophthalate, dimethyl phthalate and mixtures thereof.

The above-described polyester polyols can be formed using procedures well known in the art. Usually, the polyester polyol is formed by direct esterification, ester exchange, or condensation reaction between the $C_{2-15}$ aliphatic acyclic or $C_{4-15}$ alicyclic polyols, the polycarboxylic acids and, where used, the omega-hydroxyalkanecarboxylic acids, or lactones. Generally, the above reactants are combined, preferably in the presence of a suitable esterification catalyst, and heated to a temperature sufficient to distill off volatile side products, preferably under an inert atmosphere such as carbon dioxide or nitrogen. The reaction is completed by heating the reactants under vacuum for about 2 to 24 hours or more, until the acid number of the reaction mixture falls below about 5 milligrams of KOH per gram of reaction mixture and the hydroxyl equivalent weight of the reaction mixture is between about 31 and 1000, preferably between about 59 and 300.

Suitable commercially available polyester polyols include "Lexorez" 5171-280, 5171-260 and 5171-200 (polyester polyols derived from trimethylolpropane, dipropylene glycol, adipic acid, and phthalic anhydride, having a hydroxyl functionality of 5 to 7, and hydroxyl equivalent weights of 200, 216 and 280, respectively), "Lexorez" XP 142-144 (polyester polyol derived from neopentyl glycol, trimethylolpropane, and adipic acid, having a hydroxyl functionality of 5 to 7, a hydroxyl equivalent weight of 200, and a molecular weight of 1000), and "Rucoflex" F-2016-185 (polyester polyol having a nominal hydroxyl functionality of 4, a nominal hydroxyl equivalent weight of 300, and a nominal molecular weight of 1200). The "Lexorez" resins are commercially available from Inolex Corporation while "Rucoflex" is commercially available from Hooker Chemical Company.

Polyether polyols which can be used to prepare the polymerizable carbamic ester resins of this invention are preferably prepared by the condensation of aliphatic polyols having at least two hydroxyl groups per molecule with alkylene oxides, in the presence of an alkaline catalyst. Preferred aliphatic polyols for use in the preparation of such polyether polyols include erythritol, pentaerythritol, mannitol, sorbitol, and mixtures thereof. Preferred alkylene oxides for use in the preparation of such polyether polyols include butylene oxide, propylene oxide, and mixtures thereof.

Useful commercially available polyether polyols include "Niax" LS-490 (polyetherpolyol having a hydroxyl functionality of 6, a hydroxyl equivalent weight of 114, and a molecular weight of 684) from Union Carbide Co.

Polyacrylate polyols which can be used to prepare the polymerizable carbamic ester resins of this invention are polymers of hydroxyalkyl acrylates or methacrylates prepared with or without other copolymerizable ethylenically-unsaturated monomers that have been polymerized in the presence of a sufficient amount of chain terminator to limit the molecular weight of the resulting polyacrylate polyol to below about 5000.

Suitable polyacrylate polyols include "TSAX" 11071, (polyacrylate polyol having a hydroxyl equivalent weight of 900), available from Henkel Corporation.

Acryloyloxyalkylisocyanurate compounds of Formula III are isocyanurates that have been substituted by acryloyloxy groups. Such compounds and their preparation are disclosed in U.S. Pat. No. 3,808,226 (Habermeier et al), which is incorporated by reference. Examples of these compounds are 1,3,5-tris(6-[2,2,2-(triacryloyloxymethyl)ethoxycarbonylamino]hexyl)-s-triazine-(1H,3H,5H)trione, 1,3,5-tris(4-[2-(methacryloxy)ethoxy-carbonylamino]cyclohexyl)-s-triazine-2,4,6(1H,3H,5H)trione and 1,3,5-tris(3-[2,2,2-(triacryloyloxymethyl)ethoxy]-2-hydroxypropyl)s-triazine-2,4,6(1H,3H,5H)trione.

Polyacrylamido compounds of Formula IV are well known and are the reaction product of polyamino compounds with acrylic or methacrylic acid, their halides, anhydrides or esters of a $C_1$ to $C_4$ alkanol. Examples of polyacrylamido compounds include 1,2-diacryloylaminoethane, 1,3-diacryloylaminopropane, 1,4-diacryloylaminobutane, 1,6-diacryloylaminohexane, 1,4-bis(acryloylaminoethyl)cyclohexane, 1,10-diacryloylaminodecane, 3,3-bis(acryloylaminoethyl)propane, 1,2,3-triacryloylaminopropane, 1,3,5-triacryloylaminocyclohexane, and 1,5-diacryloylamino-3-oxapentane and the corresponding methacrylamino compounds.

Polymerizable poly(acryloyloxyalkoxy) compounds of Formula V (Part II-2-b) of the polymerizable composition are the polyacrylic esters of polyols that are obtained by reaction of an alkane, cycloalkane, or azacycloalkane polyol with an alkylene oxide. Examples of such polymerizable esters include 1,1,1-tris(2-acryloyloxyethoxymethoxy)propane, tetra(2-acryloyloxypropoxymethoxy)methane, the hexaacrylate ester of hexapropoxylated dipentaerythritol, the pentaacrylate ester of pentabutoxylated arabitol, and the triacrylate ester of triethoxylated 1,3,5-trihydroxyethyl isocyanurate.

Diluent monomers for use in the above-mentioned compositions are free-radical polymerizable monomers such as olefins which preferably contain at least one acrylyl or methacrylyl radical. Examples of suitable diluent monomers include acrylic acid, methacrylic acid, acrylamide, methacrylamide, methyl acrylate, methyl alpha-chloroacrylate, ethyl acrylate, hexyl acrylate, 2-ethylhexyl acrylate, butoxyethoxyethyl acrylate, neopentylglycol diacrylate, pentaerythritol mono-, di-, or triacrylate or mixtures thereof, isodecyl acrylate, trimethylolpropane mono-, di-, or triacrylate or mixtures thereof, 2-phenoxyethyl acrylate, glycidyl acrylate, 2-ethoxyethyl acrylate, 2-methoxyethyl acrylate, tetrahydrofurfuryl acrylate, 2,2,2-trifluoroethyl acrylate, cyanatoethyl acrylate, 2-carbamoyloxyethyl acrylate, 2-(N-methylcarbamoyloxy)ethyl acrylate, 2-(N-butylcarbamoyloxy)ethyl acrylate, methacrylates of the above acrylates, and mixtures of the above diluent monomers. Other diluent monomers which can be used include acrylonitrile, styrene, 4-methyl-styrene, alpha-methylstyrene, alpha-chlorostyrene, 4-bromostyrene, cyclopentadiene, vinyl chloride, vinylidene chloride, vinyl acetate, vinyl methyl ketone, isopropyl vinyl ketone, and mixtures thereof. Preferably, the diluent monomers are added to the polymerizable carbamic compound after formation thereof, rather than being present during formation of the polymerizable carbamic compound, in order to avoid possible yellowing of the polymerizable carbamic ester resin.

By selecting various diluent monomers or mixtures thereof, the index of refraction and cure time of the cast articles of this invention can be adjusted within limits. For example, mixtures of neopentylglycol diacrylate and 2-phenoxyethyl acrylate can be used as diluent monomers, and the ratio of these two diluent monomers can be altered to vary the index of refraction of the resulting cast articles between about 1.50 to 1.54. This is particularly useful when it is desired to prepare cast optical articles. Other diluent monomers can be similarly used. Cure times for casting resins containing various diluent monomers are described in more detail in the examples below.

The index of refraction of the cast articles of this invention can be varied by other means if desired. For example, increasing the aromatic content of the casting resin will tend to increase the index of refraction of articles cast therefrom. Also, use of halogenated dicarboxylic acids, halogenated polyols, or halogenated diluent monomers to form the casting resins will tend to increase the index of refraction of articles cast therefrom, at some decrease in resistance of the cured article toward yellowing after exposure to sunlight (i.e., weathering resistance).

The casting resins of this invention optionally contain zero to about five percent by weight of an energy-activatable source of free radicals, i.e., a free-radical polymerization initiator which generates or liberates free radicals upon addition to the casting resins of energy such as thermal energy, actinic radiation, or electron beam radiation. Curing techniques such as thermal energy and actinic radiation ordinarily require the use of positive amounts (i.e., more than zero percent by weight) of polymerization initiator. No polymerization initiator (i.e., zero percent by weight) is ordinarily required when curing techniques such as electron beam energy are used. Useful free-radical polymerization initiators are further described, for example, in Chapter II of "Photochemistry" by Calvert and Pitts, John Wiley & Sons (1966).

Thermally-activated free-radical polymerization initiators include organic peroxides, organic hydroperoxides, and other known initiators, such as benzoyl peroxide, tertiary-butyl perbenzoate, cumene hydroperoxide, isopropyl peroxydicarbonate, azobis(isobutyronitrile), and the like. The preferred free-radical polymerization initiators for use in this invention are photopolymerization initiators which release free-radicals when the optical casting resins of this invention are irradiated with suitable electromagnetic radiation.

Useful photopolymerization initiators include acyloin and derivatives thereof such as methyl benzoyl formate, benzoin, benzoin methyl ether, benzoin ethyl ether, benzoin isopropyl ether, benzoin isobutyl ether, and alpha-methylbenzoin, diketones such as benzil and diacetyl, organic sulfides such as diphenyl monosulfide, diphenyl disulfide, decyl phenyl sulfide, and tetramethylthiuram monosulfide, S-acyl dithiocarbamates such as S-benzoyl-N,N-dimethyldithiocarbamate, phenones such as acetophenone, alpha,alpha,alpha-tribromoacetophenone, alpha, alpha-diethoxyacetophenone, ortho-nitro-alpha, alpha,alpha-tribomoacetophenone, benzophenone, and 4,4'-bis(dimethylamino)benzophenone, and sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide and p-acetamidobenzenesulfonyl chloride. Methyl benzoyl formate is a preferred photopolymerization initiator, as it provides cast optical products having low yellow color.

For curing techniques such as thermal energy and actinic radiation, the free-radical polymerization initiator is ordinarily used in amounts ranging from about 0.01 to 5 percent by weight compared to the total weight of optical casting resin. When the polymerization initiator quantity is less than about 0.01 percent by weight, the polymerization rate of the casting resin is slowed. When the polymerization initiator is used in amounts greater than about five percent by weight, no appreciable increase in polymerization rate is observed compared to compositions containing about five percent by weight of polymerization initiator. Preferably, about 0.05 to 1.0 percent by weight of polymerization initiator is used in the polymerizable casting resins of this invention cured by thermal energy or actinic radiation.

Adjuvants which are conventionally used in resins for cast articles, particularly optical articles, such as inhibitors, antioxidants, dyes, mold release agents, and the like can be added if desired. However, a mold release agent is generally not required with the casting resins of this invention, and the absence of a mold release agent represents a manufacturing advantage of this invention.

Several physical properties of the casting resins of this invention can be adjusted by, for example, varying the amounts and types of monomers used to synthesize the polymerizable carbamic ester resin, varying the relative amounts of polymerizable carbamic ester resin(s) and diluent monomer(s); varying the types of diluent monomers, or using a mixture of diluent monomers. For example, the hardness of the cured casting resin can be increased by: (1) increasing the vinyl functionality or decreasing the molecular weight of the polymerizable carbamic compound, (2) using a polymerizable carbamic ester derived from a polyester polyol prepared from a mixture of cyclic compounds and aliphatic acyclic polyol, containing the above-described ratio of about 0.02 to 0.5 moles of cyclic compounds selected from alicyclic dicarboxylic acids, aromatic dicarboxylic acids, anhydrides thereof, or cycloalkylene diols per mole of aliphatic acyclic polyol, or (3) by increasing the olefinic functionality of the diluent monomer. Shrinkage of the casting resin during cure can be reduced by increasing the molecular weight of the polymerizable carbamic ester resin. Ordinarily, it is desirable to minimize yellow coloration in certain plastic articles such as optical articles both at the time of manufacture and after exposure to sunlight. Tendency toward initial yellow coloration can be reduced by employing purified ingredients and by utilizing the preferred photoinitiator methyl benzoyl formate. Weathering resistance can be increased by minimizing aromatic content in the backbone of Formula I, above, or by adding to the casting resin one or more ultraviolet light absorbers such as hydroxybenzophenones (e.g., 2,4-dihydroxybenzophenone and 2-hydroxy-4-methoxybenzophenone), carboxybenzophenones (e.g., 2-hydroxy-4-carboxybenzophenone), benzotriazoles (e.g., 2-(2'-hydroxy-5'-methylphenyl)benzotriazole), cyanoacrylates (e.g., 2-ethylhexyl-2-cyano-3,3-diphenylacrylate), and the like. Abrasion resistance of the cured cast article can be increased by using a diluent monomer having a high level of olefinic functionality (e.g., pentaerythritol tetraacrylate or trimethylolpropane triacrylate). The working environment in production operations can be improved by using a diluent monomer such as neopentylglycol dimethacrylate or n-butylcarbamoyloxyethyl acrylate. Viscosity of the casting resin can be reduced by utilizing a diluent monomer having low viscosity and/or high solvating power with respect to the polymerizable carbamic ester resin.

The articles of this invention include articles which are currently prepared from ground glass or cast plastic, such as ophthalmic lenses, diffraction gratings, Fresnel lenses, and video discs. Such articles generally have a thickness of about 2 mm or more, and can be prepared from casting resins of this invention which are made by mixing in a suitable vessel, in any convenient order, the diluent monomer and polymerizable carbamic ester resin, to provide 100 parts of a composition having a viscosity less than about 1000 poise at 20° C. To the resulting mixture is then added up to about five parts by weight of polymerization initiator, if desired. Mixing is continued until the components of the composition are in a single phase. If prepared using photoinitiator, the composition is preferably stored in the dark or under a suitable safelight until ready for use.

At the time of use, the composition is preferably degassed using a vacuum of less than about 25 Torr or by flowing the composition in a thin film past a suitable boundary. The degassed composition is introduced, preferably using a pressure of about 2 to 10 Kg/cm$^2$, into a mold corresponding to the shape of the article which is desired to be prepared. Such molds are generally made of glass or glass and metal and may include a resilient gasket which compensates for polymerization shrinkage. Casting resins of this invention containing thermally-activated polymerization initiators are cured or polymerized to a hard, transparent state by placing the filled mold into a forced air oven or water bath at a temperature of about 50° C. to 100° C. for a period of about 1 to 12 hours, followed by an increase in temperature to about 75° C. to 150° C. over a period of about 1 to 12 hours, followed by removal of the molds from the oven or bath, opening of the molds, and cooling of the cured articles contained therein.

For casting resins of this invention containing photopolymerization initiator, the molds are filled as described above, placed under a source of electromagnetic (e.g., actinic) radiation such as a high energy ultraviolet source having an output of, e.g., about 25 to 250 watts/cm of source length. Preferably, the duration and intensity of such exposure is adjusted to provide for partial (e.g., about 50 to 80 percent) polymerization of the resin contained in the molds. The partially polymerized articles can then be removed from the molds. Cure or photopolymerization of the articles to a hard, transparent state can be completed by exposure of the articles (unsupported by molds) to sufficient additional radiation to complete the polymerization of such articles. If desired, final cure can be carried out using thermal energy.

Preferred photoinitiation energy sources emit actinic radiation, i.e., radiation having a wavelength of 700 nanometers or less which is capable of producing, either directly or indirectly, free radicals capable of initiating addition polymerization of the optical casting resins of this invention. Particularly preferred photoinitiation energy sources emit ultraviolet radiation, i.e., radiation having a wavelength between about 180 and 460 nanometers, including photoinitiation energy sources such as mercury arc lights, carbon arc lights, low, medium, or high pressure mercury vapor lamps, swirl-flow plasma arc lamps, ultraviolet light emitting diodes, and ultraviolet light emitting lasers. Particularly preferred ultraviolet light sources are "black lights" and medium or high pressure mercury vapor lamps, such as Models 60-2032, 60-0393, 60-0197 and 50-2031 (commercially available from PPG Industries, Inc.), and Models 6512A431, 6542A431, 6565A431, and 6577A431 (commercially available from Hanovia, Inc.).

Ionizing radiation can also be used to cure the casting resins of this invention. Ionizing radiation is radiation possessing an energy at least sufficient to produce ions either directly or indirectly and includes ionizing particle radiation and ionizing electromagnetic radiation. Ionizing particle radiation designates the emission of electrons (i.e., "E-beam" radiation) or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyclotrons, and the like. Uncharged particles (i.e., neutrons) can be produced by bombarding a selected light metal such as beryllium with positive particles of high energy. Ionizing particle radiation can also be obtained by the use of an atomic pile, radioactive isotopes or other natural or synthetic radioactive materials. Ionizing electromagnetic radiation transmits high energy photons by means such as X-rays, bremsstrahlung and gamma rays.

Abrasion resistance is measured by determining the weight required to provide a scratch in the surface of an article having a surface radius of about 5 cm that is mounted below a weighted lever arm, the end of which bears a 2 cm×2 cm patch of 000 steel wool that rests on the surface of the article. The article is oscillated at about 30 pulses per minute through about 3 cm of an arc having a radius of about 5 cm. Weight is increased on the lever arm until a scratch is observed on the surface of the article. The weight per square centimeter of surface contacting steel wool is then calculated as the scratch resistance of the article.

The following examples are offered to aid in understanding the present invention and are not to be construed as limiting the scope thereof.

EXAMPLE 1

This example illustrates the preparation of an urethane hexaacrylic ester. Into a reaction flask equipped with an agitator, liquid addition funnel, thermometer, and inlet tube for the introduction of dry air for maintaining an anhydrous atmosphere was placed 105 g isophoronediisocyanate and several drops of dibutyltin dilaurate (DBTDL). The resulting mixture was agitated and 448 g of pentaerythritol triacrylate (the acrylic anhydride-pentaerythritol reaction product having a hydroxyl equivalent weight of 448) was added over a 30 minute period. The mixture was agitated and heated until I.R. analysis indicated disappearance of the —NCO absorption peak (about three hours).

The urethane polyacrylate ester, as prepared, was placed into a mixing flask and 0.10% by weight of methyl benzoyl formate added. The contents of the flask were stirred until completely mixed and filtered into a storage vessel which was evacuated at a pressure of about 10 Torr for about five minutes to remove bubbles from the casting resin.

An ophthalmic lens mold was prepared by sandwiching a resilient annular gasket made of plasticized polyvinyl chloride between a 65 mm diameter glass die and a cover glass. The glass die had a polished, concave, high base curve surface with a diopter of 6. The cover glass had a polished, convex surface with a diopter of 6. It was not necessary to clamp the assembly together.

The mold cavity was filled with casting resin by applying a pressure of about 0.5 Kg/cm$^2$ to the storage vessel containing the degassed casting resin, and conducting the casting resin from the storage vessel through a flexible tube to the mold cavity. A hollow needle attached to the end of the flexible tube was used to introduce the optical casting resin into the mold cavity through an opening made by puncturing the sidewall of the resilient annular gasket. After filling the mold, the needle was withdrawn and the hole in the sidewall of the gasket was plugged with a screw. The filled mold was placed under a 25 watt black light and irradiated for 2 to 10 minutes through both halves of the lens mold. After such exposure to ultraviolet radiation, the casting resin had cured to about 70 to 80 percent of final hardness, and the temperature of the cast article inside the mold had increased to about 74° C. The cast article was removed from the mold and post cured by exposure to ultraviolet radiation for an additional ten seconds on the convex side. The resulting ophthalmic lens was completely colorless, had a refractive index of about 1.51, a light transmission of greater than 90% and a center thickness of about 1.0 cm. It had a Barcol hardness of 50 and an abrasion resistance of about 700 kPa (100 psi) on the convex side.

EXAMPLE 2

An urethane nonaacrylic ester was prepared by the procedure described in Example 1 from 90.5 g of the trimer of hexamethylene diisocyanate (available as KL5-2444 from Mobay Chemical Co.), 209 g pentaerythritol triacrylate (having a hydroxyl equivalent weight of 411), and 6 drops of DBTDL. The mixture was heated at 70° C. until the —NCO absorption peak disappeared (about three hours).

An ophthalmic lens was prepared as described in Example 1. It had a Barcol hardness of 50 and scratch resistance of about 620 kPa (90 psi) when post cured in air but a scratch resistance of greater than 830 kPa (120 psi) when post cured under nitrogen. It also had a refractive index of 1.52 and a Gardner color of about 3 and a light transmission of greater than 90%.

EXAMPLES 3-8

This example illustrates the preparation of a polymerizable carbamic compound (Formula II). Into a reaction flask equipped with an agitator, liquid addition funnel, thermometer, and inlet tube for the introduction of nitrogen atmosphere was placed 600 g (0.6 mole) of "Lexorez" 5171-280, 1.5 g dibutyltin dilaurate, and 21. g "Irganox" 1010 antioxidant [(tetrakis)3-[3,5-di(t-butyl)-4-hydroxyphenyl]propionyloxymethyl methane], commercially available from Ciba Geigy, Inc. The resulting mixture was agitated, and 465 g (3.0 moles) of 2-isocyanatoethyl methacrylate was added to the reaction flask over a 30 minute period, with the rate of addition of the 2-isocyanatoethyl methacrylate being adjusted to keep the temperature of the reaction mixture from exceeding about 75° C. A heating mantle was placed about the reaction flask, and the reaction mixture was heated for an additional 30 minutes at a temperature of about 70° C. to 75° C., until infrared analysis of the reaction mixture indicated that the isocyanate groups had been consumed. The reaction product was allowed to cool, and designated "Oligomer A".

Oligomer A was blended with various amounts of pentaerythritol tetraacrylate and tetraethyleneglycol diacrylate and 0.1% by weight of the total composition of Vicure 55. A lens was prepared from each composition by the procedure described in Example 1. The abrasion resistance of lenses prepared from each composition is given in Table I.

TABLE I

| Lens Casting Composition$^{(a)}$ | Experiment No. | | | | | |
|---|---|---|---|---|---|---|
| | 3 | 4 | 5 | 6 | 7 | 8 |
| PETA$_4$$^{(b)}$ | 10 | 20 | 30 | 40 | 45 | 50 |
| Oligomer A | 50 | 50 | 50 | 50 | 45 | 50 |
| TEGA$_2$$^{(c)}$ | 40 | 30 | 20 | 10 | 10 | 0 |
| Abrasion Resistance$^{(d)}$ | 10 | 5 | 10 | 20 | 350-700 | 200-300 |

$^{(a)}$Percent by weight of each component
$^{(b)}$Pentaerythritol tetraacrylate
$^{(c)}$Tetraethyleneglycol diacrylate
$^{(d)}$Abrasion resistance in kPa It is apparent from Table I that Oligomer A diluted with up through 40% by weight of pentaerythritol tetraacrylate yields lenses that have an abrasion resistance of no more than 20 kPa, and that between 40 and 45% there is a surprising increase in abrasion resistance to above 350 kPa. By comparison, an uncoated lens prepared from diethyleneglycol bis(allyl carbonate), had abrasion resistance of 20 kPa.

EXAMPLE 9

A polymerizable carbamic ester (Formula II) was prepared by melting in a round-bottom flask 177 g 1,6-hexanediol and adding 449 g 2-isocyanatoethyl methacrylate while cooling the mixture with a water bath to maintain the temperature at 60° C. during the addition. After the addition, heat was applied for one to two hours, after which time infrared analysis indicated disappearance of —NCO. The product solidified on cooling the reaction mixture (m.p. about 55° C.).

The above carbamic ester was dissolved in an equal weight of warm pentaerythritol tetraacrylate and 0.1% by weight of Vicure 55 added. A lens prepared as described in Example 1 had an abrasion resistance of 840 kPa and a Gardner color of 3. It also had a light transmission of greater than 90% and a refractive index of 1.52.

EXAMPLE 10

A casting composition was prepared by blending 50 g pentaerythritol tetraacrylate, 50 g 1,3,5-tris(2-acryloyloxyethyl)isocyanurate (Formula III), and 0.1 g Vicure 55. A lens was prepared from the composition as described in Example 1. It had an abrasion resistance of 1050 kPa and a Gardner color of 11 on the "b" scale.

EXAMPLE 11

A casting composition was prepared by blending 50 g of the reaction product of one mole of 1,3,5-tris(6-isocyanotohexyl)-1,3,5-triazine-2,4,6-(1H,3H,5H)-trione, two moles of pentaerythritol triacrylate and one mole of 2-hydroxyethyl methacrylate (Part I) with 25 g of pentacrythritol tetraacrylate and 25 g of 1,3,5-tris(2-acryloyloxyethyl)isocyanurate (Part II). There was then added 0.1% of Vicure 55 and a lens prepared as described in Example 1. The lens obtained had a refractive index of 1.52, was essentially colorless and had an abrasion resistance of at least 500 kPa.

I claim:

1. An article comprising a polymerized resin derived from (I) at least 45 parts by weight of a urethane polyacrylic ester first component having the formula

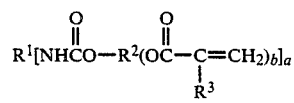

FORMULA I wherein:
R$^1$ has the valence "a" and is the residue remaining after the removal of —NCO groups from an organic polyisocyanate;
R$^2$ has the valence b+1 and is a polyvalent aliphatic group having 4 to 10 carbon atoms;
R$^3$ is —H or —CH$_3$;
a is a number having a value of at least 2; and
b is an integer of 3 to 5,
(II) at most 55 parts by weight of a second component containing (A) from 30 to 60% by weight of a polyacrylic ester, (B) from 20 to 70% by weight of a polymerization shrinkage modifier, and (C) from 0 to 30% by weight of a diluent monomer, and (III) from 0 to 5% by weight of I plus II of a source of free radicals, said article having an inherent abrasion resistance to 000 steel wool of at least 140 kPa.

2. An article according to claim 1 wherein said urethane polyacrylic ester is the reaction product of a polyacryloyloxyalkanol and a polyisocyanate.

3. An article according to claim 2 wherein said polyacryloyloxyalkanol comprises a polyol having from 4 to 10 carbon atoms and from 4 to 6 hydroxy groups, and said polyisocyanate comprises a di- or triisocyanate.

4. An article according to claim 3 wherein said polyacryloyloxyalkanol is selected from pentaerythritol triacrylate, dipentaerythritol pentaacrylate, 2,2,3,3-tetra(acryloyloxymethyl)propanol, arabitol tetraacrylate, and sorbitol pentaacrylate and the corresponding methacrylates and said polyisocyanate is selected from 2,4-tolylene diisocyanate, 3,5,5-trimethyl-1-isocyanato-3-isocyanatomethylcyclohexane, hexamethylene diisocyanate, 1,3,5-tris(6-isocyanatohexyl-1,3,5-triazine-2,4,6(1H,3H,5H)trione, 1,3-di(isocyanatoethyl)hydantoin, 2,2,4-trimethylhexamethylene diisocyanate and 1,3,5-benzenetriisocyanate.

5. An article according to claim 4 wherein said polyacryloyloxalkanol is pentaerythritol triacrylate or methacrylate and said polyisocyanate is 1,3,5-tris(6-isocyanatohexyl)-1,3,5-triazine-2,4,6-(1H,3H,5H)trione.

6. An article according to claim 1 wherein said polymerized resin is derived from 100 parts by weight of said first component and from 0 to 5% by weight of said source of free radicals.

7. An article according to claim 1 wherein said second component comprises from 45 to 60 percent by weight of said polyacrylic ester and from 20 to 55 percent by weight of said polymerization shrinkage modifier.

8. An article according to claim 7 wherein said polyacrylic ester of said second component is derived from an alkane, a cycloalkane, or an azacycloalkane polyol, the polyol having up to 24 carbon atoms and the ester having from 4 to 10 acryloxy groups and nitrogen, when present, being covalently bonded to the carbon of a carbonyl group.

9. An article according to claim 8 wherein said polymerization shrinkage modifier of said second component is a polymerizable carbamic compound having at least two of

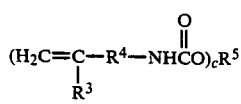

groups and at least two acrylic groups per 168 to 2000 of molecular weight and a molecular weight of 168 to 5000.

10. An article according to claim 9 wherein said polymerization shrinkage modifier has the formula

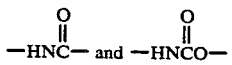    FORMULA II in which:
R$^3$ is —H or —CH$_3$;
R$^4$ is a divalent aliphatic group selected from —R$^6$— and

in which —R$^6$— is an alkylene group having 1 to 6 carbon atoms or a 5- or 6-membered cycloalkylene group having 5 to 10 carbon atoms;
R$^5$ is a polyvalent linear structure obtained by removal of the hydroxyl groups from a monomeric or polymeric aliphatic polyol; and
c is an integer of from 2 to 15.

11. An article according to claim 9 wherein said polymerization shrinkage modifier has the formula

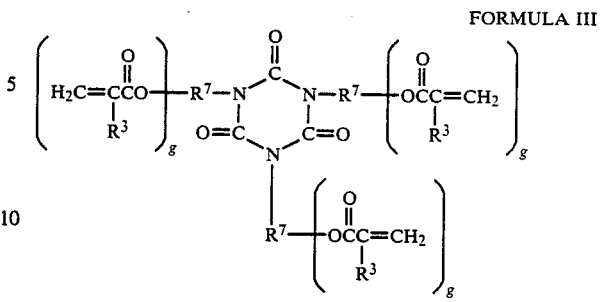    FORMULA III in which:
R$^7$ is a polyvalent aliphatic group selected from R$^6$ and

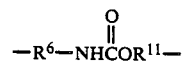

in which R$^6$ is an alkylene group having 1 to 6 carbon atoms or a 5- or 6-membered cycloalkylene group having 5 to 10 carbon atoms and R$^{11}$ has a valence of g+1 and is a polyvalent aliphatic group having 4 to 10 carbon atoms and, optionally, one catenary oxygen atom;
g is an integer of 1 to 3.

12. An article according to claim 9 wherein said shrinkage modifier has the formula

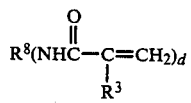    FORMULA IV wherein:
R$^3$ is —H or —CH$_3$;
R$^8$ is a linear, branched, or cyclic alkadiyl or -triyl group having 2 to 10 carbon atoms and, optionally, up to 4 catenary oxygen atoms; and
d is the integer 2 or 3.

13. An article according to claim 9 wherein said polymerization shrinkage modifier has the formula

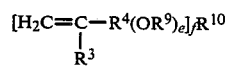    FORMULA V in which:
R$^3$ is —H or —CH$_3$;
R$^4$ is a divalent aliphatic group selected from —R$^6$— and

in which —R$^6$— is an alkylene group having 1 to 6 carbon atoms or a 5- 6-membered cycloalkylene group having 5 to 10 carbon atoms;
R$^9$ is alkylene having from 2 to 4 carbon atoms;
e is a number having a value of 1 to 3;
f is an integer of from 3 to 6; and
R$^{10}$ is a residue of an alkane, cycloalkane, or azacycloalkane polyol having up to 24 carbon atoms and the nitrogen of the azacycloalkane being covalently bonded to the carbon of a carbonyl group.

14. An article according to claim 7 wherein said polymerization shrinkage modifier is 1,3,5-tris(2-acryloyloxyethyl)isocyanurate.

15. An optical article in accordance with claim 1.

16. An optically clear article according to claim 15.

17. An optical article according to claim 16 having an index of refraction of from 1.45 to 1.75.

18. An optical article according to claim 16 having a maximum thickness of at least 2 millimeters.

19. An ophthalmic lens according to claim 16.

20. An ophthalmic lens according to claim 19 wherein said urethane polyacrylic ester first component is the reaction product of a polyaryloyloxyalkanol and a polyisocyanate.

21. An ophthalmic lens according to claim 20 wherein said polyacryloyloxyalkanol comprises a polyol having from 4 to 10 carbon atoms and from 4 to 6 hydroxy groups, and said polyisocyanate comprises a di- or triisocyanate.

22. An ophthalmic lens according to claim 21 wherein said polyacryloyloxyalkanol is selected from pentaerythritol triacrylate, dipentaerythritol pentaacrylate, 2,2,3,3-tetra(acryloyloxymethyl)propanol, arabitol tetraacrylate, and sorbitol pentaacrylate and the corresponding methacrylates and said polyisocyanate is selected from 2,4-tolylene diisocyanate, 3,5,5-trimethyl-1-isocyanato-3-isocyanatomethylcyclohexane, hexamethylene diisocyanate, 1,3,5-tris(6-isocyanatohexyl-1,3,5-triazine-2,4,6(1$\underline{H}$,3$\underline{H}$,5$\underline{H}$)trione, 1,3-di(isocyanatoethyl)hydantoin, 2,2,4-trimethylhexamethylene diisocyanate and 1,3,5-benzenetriisocyanate.

23. An ophthalmic lens according to claim 22 wherein said polyacryloyloxalkanol is pentaerythritol triacrylate or methacrylate and said polyisocyanate is 1,3,5-tris(6-isocyanatohexyl)-1,3,5-triazine-2,4,6-(1$\underline{H}$,3$\underline{H}$,5$\underline{H}$)trione.

24. An ophthalmic lens according to claim 19 wherein said second component comprises from 45 to 60 percent by weight of said polyacrylic ester and from 20 to 55 percent by weight of said polymerization shrinkage modifier.

25. An ophthalmic lens according to claim 24 wherein said polymerization shrinkage modifier is the reaction product of polyester polyol having a hydroxyl functionality of 5 to 7 and 2-isocyanatoethyl methacrylate and the polyacrylic ester is dipentaerythritol pentaacrylate.

* * * * *